US 7,957,931 B2

(12) United States Patent
Nilsagard et al.

(10) Patent No.: US 7,957,931 B2
(45) Date of Patent: Jun. 7, 2011

(54) POSITIONING PATTERN (75) Inventors: Jonas Nilsagard, Sävedalen (SE); Olle Takman, Mölnlycke (SE); Manne Stenberg, Göteborg (SE)

(73) Assignee: GCoder Systems AB, Molnlycke (SE)

( * ) Notice: Subject to any disclaimer, the term of this patent is extended or adjusted under 35 U.S.C. 154(b) by 324 days.

(21) Appl. No.: 12/158,748

(22) PCT Filed: Oct. 6, 2006

(86) PCT No.: PCT/SE2006/001136
§ 371 (c)(1),
(2), (4) Date: Aug. 14, 2008

(87) PCT Pub. No.: WO2007/073272
PCT Pub. Date: Jun. 28, 2007

(65) Prior Publication Data
US 2009/0177416 A1    Jul. 9, 2009

(30) Foreign Application Priority Data
Dec. 23, 2005   (SE) ...................................... 0502884

(51) Int. Cl.
G01B 11/26   (2006.01)
(52) U.S. Cl. ....................................................... 702/152
(58) Field of Classification Search ................... 702/152
See application file for complete search history.

(56) References Cited

U.S. PATENT DOCUMENTS

| 5,214,426 | A  |   | 5/1993 | Minohara |
| 5,319,577 | A  |   | 6/1994 | Lee |
| 5,965,879 | A  |   | 10/1999 | Leviton et al. |
| 6,169,396 | B1 | * | 1/2001 | Yokotani et al. ......... 324/207.21 |
| 6,172,665 | B1 |   | 1/2001 | Bullister |
| 6,360,948 | B1 |   | 3/2002 | Yang |
| 6,765,195 | B1 |   | 7/2004 | Leviton |

FOREIGN PATENT DOCUMENTS

| EP | 0729112 A2 | 8/1996 |
| WO | WO 0165225 A2 | 9/2001 |

OTHER PUBLICATIONS

International Search Report, Jan. 26, 2007.

* cited by examiner

*Primary Examiner* — Tung S Lau
(74) *Attorney, Agent, or Firm* — Buchanan Ingersoll & Rooney PC (57) ABSTRACT An absolute position detection device, system and method using a pattern comprising two types of position data: location of the pattern relative an object and position of the pattern relative a sensing device, e.g. a camera. The device comprise the sensing device acquiring images of the pattern located on the object and a computational unit analysing the images for determining absolute position of the object relative the sensing device. The present invention is realized in a number of applications, such as forming part of a torque sensor, a theodolite, an articulating arm, or an angular detector.

21 Claims, 6 Drawing Sheets

POSITIONING PATTERN

TECHNICAL FIELD

The present invention relates to a device, method and system for determining a position of an object and in particular to a vision based solution using a pattern comprising absolute position data.

BACKGROUND OF THE INVENTION

Many different types of control devices have been constructed for various purposes. The most common control device is the so called mouse giving positioning variables in two dimensions for use in controlling operation of applications on a computer. Other interface control devices include the so called joystick which gives positioning variables also in two dimensions from the stick; however, by using extra buttons in conjunction with the stick it is possible to enhance the number of "positioning variables", but it should be understood that this device physically only measures positioning variables in two dimensions. A trackball also delivers data for two dimensions; a game pad often uses a small joystick like handle for measuring positioning variables and may extend the range of the functionality of the controller to more control data by utilizing extra buttons; a steering wheel (for computer gaming) delivers data in one dimension.

In many solutions found, the control device only gives reference measurements and not absolute measurements, meaning that for an application relying on absolute coordinates of the control device to function properly complex computing is needed to continuously keep track of the location of the control device. Still such devices either need to be calibrated regularly or they will continuously build up an error that quickly may become critical depending on application.

Also in other technical areas apart from above mentioned control devices, positioning data is used for determining the position of an object, and in many cases absolute measuring solutions are used, however, they are often quite complex and not cost effective to be used in low cost applications. Vision based systems have been utilized previously and often used in conjunction with reference points, for instance in vision based positioning systems for determining the position of vehicles or objects in movement. These systems may be mounted on the vehicle or object determining the position using reference points in the surrounding area or on an external position determining the position using reference points on the vehicle or object. These systems generally are quite complex and demand high quality vision systems and high computational powers. Such a system is presented in U.S. Pat. No. 5,965,879 wherein an one-dimensional absolute optical linear or rotary encoder is shown. This solution uses identical fiducial markers for finding a position of an object. The fiducial position is calculated in one direction namely the direction of travel. Another such system is presented in U.S. Pat. No. 6,765,195 wherein a two dimensional absolute optical encoder is shown. This solution uses two different fiducial markers for determining the position of an object. The fiducials are identical across all encoded positions and arranged in a manner which is strictly periodic in each direction of travel. Both of these systems illustrate systems which need complex optical solutions and where size of patterns is of the order a few micrometers of dimension. They do not provide bending or rotational information either.

SUMMARY OF THE INVENTION

It is therefore an object of the present invention to provide an accurate and low cost device which provides absolute position data with relatively cost effective and non-complex technology and that can also provide even three or four dimensional position information (x, y, z, and rotation).

This is achieved in a number of aspects of the present invention wherein:

A first aspect, a position detecting system is provided, comprising:
- a pattern group comprising at least one node part and at least one information part and a plurality of the pattern groups are arranged on an object which a position is to be determined for;
- at least one image acquisition device for detecting the pattern; and
- a computational device analysing signals from the image acquisition device, wherein the analyses comprise determining geometrical centres in at least two directions of the pattern node parts and determining type of part for each detected pattern part; the node parts providing position relative the sensing device and the information parts providing location of the node part relative the object.

The object may be a three dimensional object, wherein the pattern group is provided on a curved surface of the object.

Two pattern group lines may be located essentially parallel to each other at a distance (d) away from each other in a longitudinal direction of a shaft. Two cameras may be provided, each reading one of the two pattern group lines.

The position detecting system may further comprise at least one illumination device. The output strength of illumination from the illumination device may be controlled by the computational device.

The node parts and information parts may comprise at least one of a filled circle, a ring, or a ring with a center marking and/or the parts may be color coded.

The pattern group and camera may be located in an enclosure providing protection from environmental parameters.

The computational device may further be arranged to determine symmetrical center positions of node points using a vision based algorithm using gradient analysis. The symmetrical centre is determined for both node and information parts of the pattern.

The node parts may comprise a plurality of different types, for instance filled point, unfilled point, or unfilled point with a centre dot. The point may have a shape chosen from one of: circular, rectangular, quadratic, or triangular.

The information parts may comprise a plurality of different types, for instance filled point, unfilled point, or unfilled point with a centre dot.

The computational device may be arranged to determine a distance between the object and the image acquisition device by measuring at least one of the size of a node part, the size of an information part, the distance between two node parts, the distance between two information parts, and the distance between a node and an information part.

A second aspect of the present invention, a torque sensor, for measuring a torque in an object, the sensor comprising:
- a position detection system comprising:
  - a pattern group comprising at least one node part and at least one information part and a plurality of the pattern groups are arranged directly or indirectly on the object;
  - at least one image acquisition device for detecting the pattern; and a computational device for analysing signals from the image acquisition device, the device further comprising means for determining geometrical centres in at least two directions of the pattern node parts and determining type of part for each detected pattern part; the node parts being arranged to provide a position relative the image acquisition device and the information parts providing location of the node part relative the object;

at least two sleeves, each with a plurality of the pattern groups, the sleeves mounted on the object; and wherein the position detection system obtain position data from each sleeve and the computational device further comprise means to detect an angular difference between the position of the sleeves and to determine a torque from the angular difference.

Yet another aspect of the present invention, a method for determining a position of an object is provided, comprising the steps of:

detecting with a sensing device a pattern group located on the object;

determining using symmetry analysis in at least two directions center positions of node points forming part of the pattern group;

determining type of node point;

determining type and position of information points located on the object; and determining absolute position of the object relative the sensing device using combined information of the position and type of points of both node and information points.

Still another aspect of the present invention, a computer program stored in a computer readable medium is provided for determining a position of an object by analyzing data indicative of a pattern group located on the object, wherein the data is received from a camera, characterized in that the computer program is arranged to determine geometrical center positions in at least two directions of node points in the pattern group for determining a position of the object relative the camera and further arranged to determine type and relative position of information points in the pattern group for determining location of the node points relative the object.

The symmetrical center positions of node points may be determined using a vision based algorithm using gradient analysis.

Yet another aspect is provided, an angular detector for determining an angular position of an object, comprising:

a position detection system comprising:

a pattern group comprising at least one node part and at least one information part and a plurality of the pattern groups are arranged on the object which a position is to be determined for;

at least one image acquisition device for detecting the pattern; and a computational device analysing signals from the image acquisition device, wherein the analyses comprise determining geometrical centres in at least two directions of the pattern node parts and determining type of part for each detected pattern part; the node parts providing position relative the image acquisition device and the information parts providing location of the node parts relative the object.

wherein said computational device further comprises means for determining an angular position of said object from said signal analysis.

BRIEF DESCRIPTION OF THE DRAWINGS

In the following the invention will be described in a non-limiting way and in more detail with reference to exemplary embodiments illustrated in the enclosed drawings, in which:

FIG. 1b illustrates a side view of the embodiment from FIG. 1a;

DETAILED DESCRIPTION OF PREFERRED EMBODIMENTS

Figure 1A:
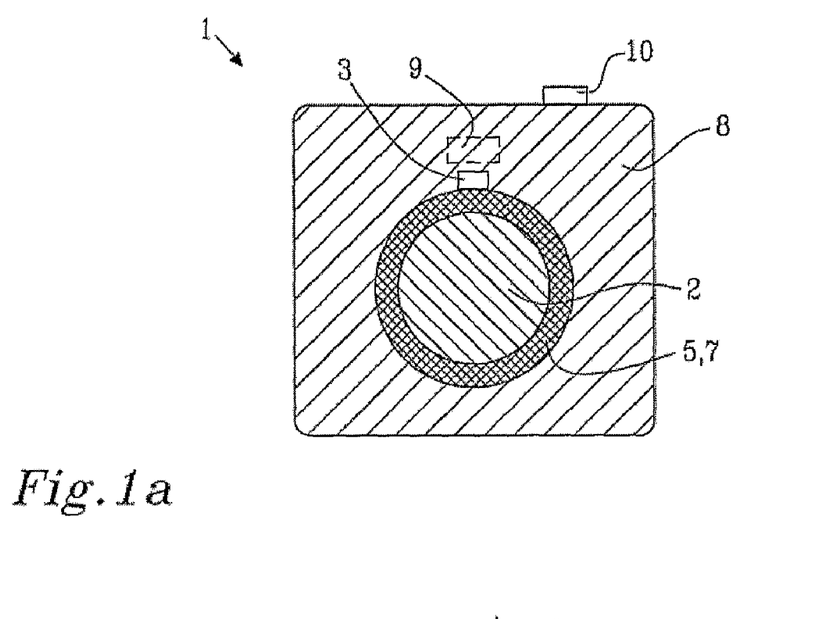
FIG. 1a illustrates a view in cross-section of a positioning device applied to an embodiment of the present invention.
Figure 1B:
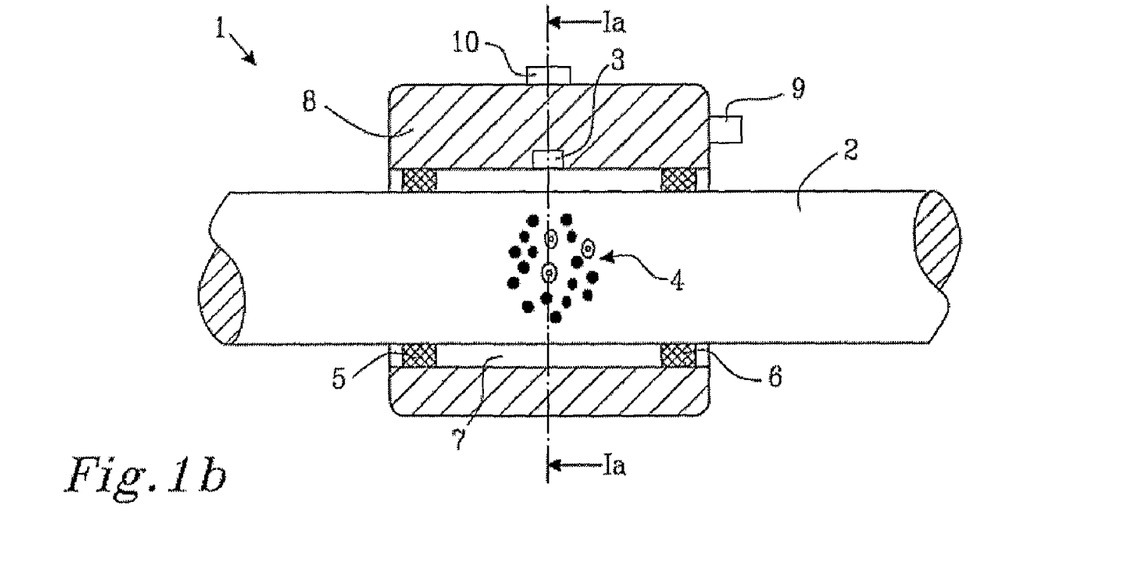

In FIG. 1, reference numeral 1 generally denotes a measuring device 1 as seen from a cross sectional view according to an embodiment of the present invention. The device 1 comprises an image acquiring device 3 positioned a distance away from an object 2 of interest. The device 1 is enclosed in a casing 8 and electrical connectors 9, and optionally a control interface 10. In FIG. 1 the object of interest is a shaft 2 and the device 1 is mounted on the shaft 2 supported by two bearings 5 and 6. The image acquiring device 3 is mounted close to the surface of the object 2 and the device 1 may be arranged in such a way as to form a cavity 7 which may be essentially sealed in order to decrease the risk of allowing dirt or other disturbing factors to enter into the cavity 7. FIG. 1a is a cross sectional view of the embodiment across Ia from FIG. 1b which is a side view of the embodiment.

Figure 2:
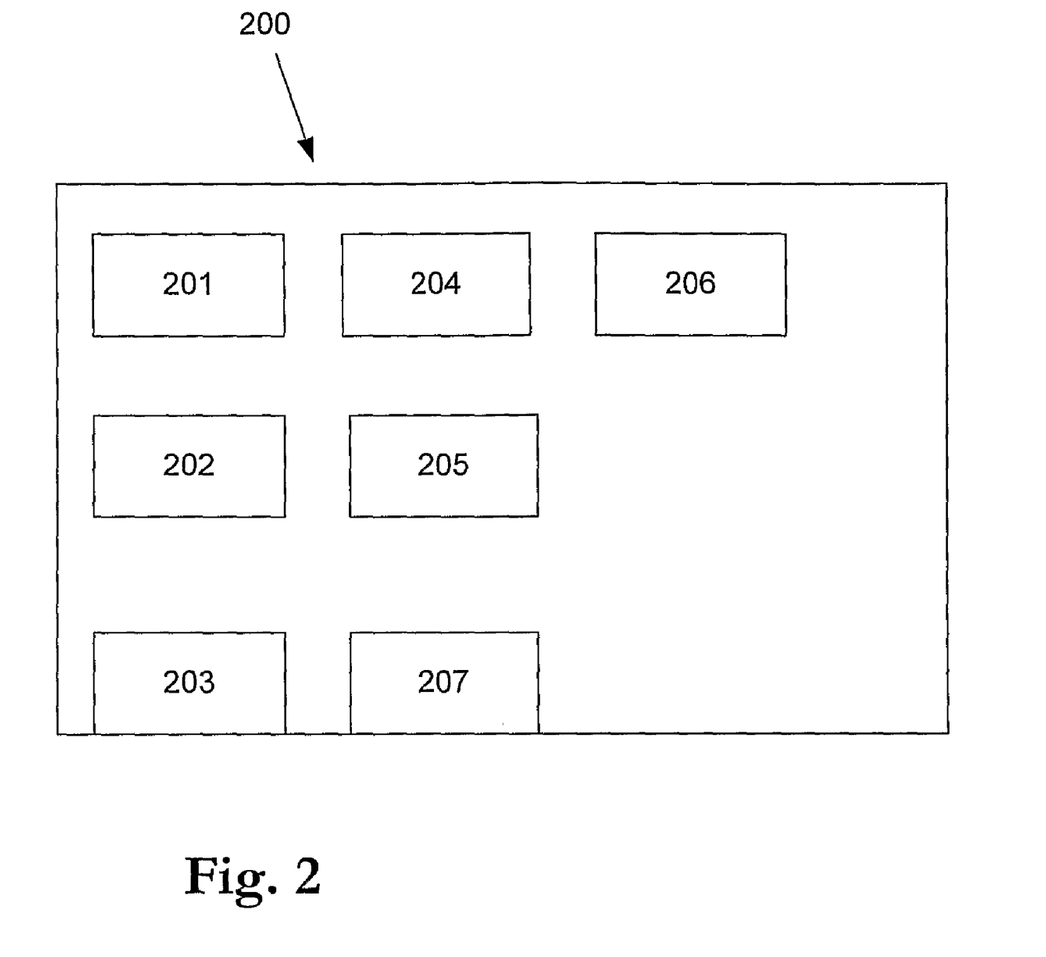
FIG. 2 schematically illustrates a processing device according to the present invention.

Signals from the image acquiring device 3 are transferred to a processing device 200, illustrated in FIG. 2, via a connector 207, for image processing and signal conditioning in order to provide a signal or signals indicative of the position of the object 2 to some external device connected to the processing device using a connector 203. The processing device may include a processor 201, memory unit (or units) 202, image processing unit 204, and other units 205 and 206 depending on application for the measuring device 1. The processing unit may have a communication interface for communicating with external devices, or optional units attached to the control device 1. Such optional units may include, but is not limited to, force feedback, clamping devices, or similar interaction devices for interacting with a user of the control device. Interfaces for both communicating with external devices or internal sensor inputs may be provided through any suitable connector or connectors as understood by the person skilled in the art, including, but not limited to, USB (universal serial bus), Firewire, RS232, RS485, Ethernet, Centronics parallel port, GPIB (general purpose interface bus), different wireless interfaces (e.g. Bluetooth and WLAN), and so on. The listed interfaces are all according to existing standard interfaces but it should be understood that it may also involve future standard solutions or even proprietary interfaces.

The processing device 200 may conveniently be situated within the measuring device it self or provided as an external stand alone device depending on application.

In the embodiment illustrated in FIG. 1 an image acquiring device 3 is used for obtaining the position of the object 2, however, other sensor types may be utilized which are arranged to obtain positioning data, for instance a magnetic sensor acquiring positions of magnetic "points" on the object 2.

Non-contacting sensor means may advantageously be utilized since part of the object 2 is encapsulated within the casing 8 of the measuring device 1; however, these types of sensors may be used even if there is no encapsulation. Therefore, there is a small amount of disturbances that can influence the reading, such as dirt, light, or stray magnetic fields. In one embodiment the casing 8 is made of an electrically conducting material with magnetic shielding properties in order to reduce the risk of influencing a magnetic sensor measuring the position of the object 2. The pattern 4 and camera 3 may be provided in an enclosure for reducing the risk of contamination from the external environment, for instance dirt or light.

However, the invention is not limited to non-contacting measurements of the object's 2 position, contacting sensors can also be used, including, but not limited to, slip rings, impedance measurements, voltage dividers, digital encoders, and capacitive measurements.

Figure 3:
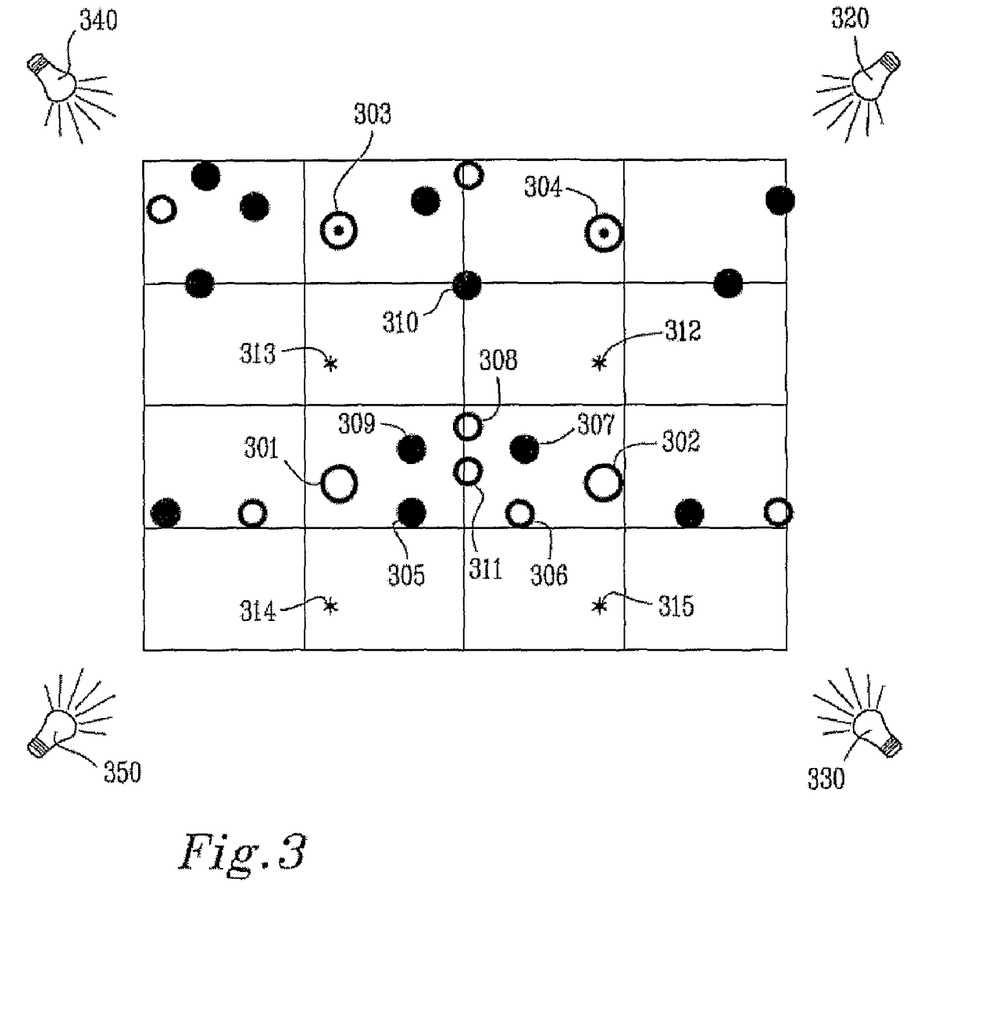
FIG. 3 illustrates a detailed view of a positioning pattern according to the present invention.

Turning now to FIG. 3, a functional pattern is described comprising node points 301 to 304 and information points 305 to 311. Points may have different sizes and with different filling ratios and these configurations will have a functional effect when reading them with a reading device such as a camera. In FIG. 3 virtual points 312-315 are also indicated, these are not markings that are present in the actual solution but may optionally be used for analysis purposes as reference points in the analysis algorithm. In order to read the points using a camera, illumination 320, 330, 340, 350 may be required depending on the application and environment. In this case four light emitting devices (e.g. Light emitting diodes (LED), light bulb (with a filament), laser diodes, infrared emitters (infrared emitters may be suitable for instance when there is some kind of contamination layer which do not absorb or reflect infrared light), or fluorescent tube) are used for providing an even light over pattern in the reading area of the camera. The pattern is repeated with variations all over the object that passes in front of the camera so as to provide possibility of obtaining an absolute position of the object. However, the invention is not limited to four illumination devices but any suitable number may be used, and in some cases where ambient light from the environment is sufficient no extra illumination is necessary. The illumination may be of any suitable frequency, for instance but not limited to: visible light, infrared light, ultraviolet light, x-ray, or microwaves.

Node points 301 to 304 may be as a ring 301, 302 or a ring with a dot 303, 304 inside (they may also be a filled circle). Node points 301 to 304 are used for determining the position in the camera window and type of point for a certain application and the determination is made in two steps: a first step for detecting the node points and a second for determining the node points' position with higher accuracy. The reason for doing the analysis in two steps is to reduce the computational power needed at each certain time unit. The more accurate determining may be made using a symmetry analysis, a centre of gravity analysis or similar method to determine the center of the point, a so called centroid calculation. This centroid calculation, using for instance gradient analysis, is done in at least two directions in order to acquire information about position in at least two directions (and possibly also rotational dimensionality of the object). The node points need to be large enough to provide a suitable number of pixels to do analysis on. In order to increase the accuracy of the determination the node points are advantageously not filled but rings with or without a dot in the center. This provides the analysis method chosen with a gradient feature both on the outside and the inside of the node point which enhances the accuracy of the center of the node analysis. The dot in the center of the ring may be used for providing a directional feature of the pattern, i.e. it will be easier for the analysis system since it will acquire reference points (or lines) on regular basis. These types of dot provided rings may be used every fifth degree around the object or so. For instance one may use undotted rings on an "equatorial" line of pattern groups and on each "southern" and "northern" 5 degrees from the "equatorial" line of pattern groups node points are used with dotted rings. Other shapes of the points may be used, for instance rectangularly or elliptically shaped points (these may be used for providing another way of obtaining directional and rotational information; i.e. the ellipse has a built in directional behavior from the shape). Other shapes may include quadratic, triangularly or irregularly shaped forms.

Information points 305 to 311 groups are centered around one node point, between two node points or between four node points. The information points are used for determining the absolute position of the pattern group. The information points have advantageously a different size than the node points in order to distinguish them from the node points. They are often smaller since they are not used for determining the position of the pattern with respect to the camera window but are used for determining the absolute coordinate of the identified group with respect to the object containing the pattern. Also these smaller information points may be of different character: filled circles, rings, and non existent (the non-existence of a point also provides information, if the system knows that a certain geometrical area may comprise points). The analysis system determines the pattern group of the information points and determines the relative position to each other and type of point character. Since the system knows the number of information points used in the information pattern groups, the system may determine which type of points is present at each location and from this analysis determine the absolute position of that information pattern group. Using seven information points as in FIG. 3 with these three different characters a very large number of unique combination are available which is sufficient for reasonable sized objects and chosen accuracy; however, it should be understood that a different number of information points may be used depending on application. Different shapes of the information points and/or node points may be utilized, the invention is not limited to round shapes but squares, triangles or any other geometrical shape (even irregular shapes) may be used. The size of the node and/or information points may be used for providing the points with different type of information and in such a case, the size may be determined from the area of each point. The size may then be used even for irregular shapes since each point may be determined by the number of pixels that build up an image of the point. Node and information points may be the same points, i.e. they need not be of different size, type or location as long as the system may use the pattern for determining location of the point on the object and a position relative the sensing device. In an application with curved surfaces, the pattern is applied in an angular system rather than in a Cartesian coordinate system; i.e. for instance every $5^{th}$ degree of the objects perimeter for a spherical object instead of every 5 mm around the perimeter. In this way irregularities of the object may be compensated for. However, it should be understood by the person skilled in the art that the pattern may be applied in a Cartesian coordinate system manner with appropriate adjustments in the calibration and/or analysis of the acquired pattern even for a non flat surface, i.e. a curved surface.

The pattern may be applied with any suitable application technique depending on type of surface and object, e.g. laser markings, engraving, etching, hobbing, knurling, scribing, dying, ink jet techniques, applied directly on the object or on a film or any other suitable material in turn fixed to the object, and so on as understood by the person skilled in the art. For instance an injection-molded sleeve may be provided with pattern groups already at the production of the sleeve and the sleeve may in turn be applied to an object of interest.

Points in the pattern group may have different depths and depth profiles in the material onto which the points are applied. This may be convenient for providing different contrast configurations. For instance a point with a conical narrowing depth wise will be seen by a camera as being darker than a point with a flat bottom surface. Also, the pattern may stand out from the object, for instance as cones sticking out from the material; this may be useful for instance for determining distance between the sensing device and the object.

The pattern may advantageously be arranged depending on type of surface, for instance to be suited for either essentially flat surfaces or curved surfaces. The present invention is particularly suited for use on curved surfaces.

The pattern may provide information about x and y position of the object as well as rotation or bending of the object in relation to the sensing device. By measuring the distance between two information or node points (or even between a node and information part) or the size of a code or node point it is also possible to determine the distance between the object and sensing device, i.e. the z position.

In case of an image acquisition device as sensing device an algorithm is used to determine the type of pattern and the relative positions and filling grade of each point. Since each pattern group is unique, it is possible to determine the absolute position of the pattern (and thus the object onto which the pattern is fixed). An analysis based on symmetry has benefits in being quick and not so computational intense and therefore possible to use in low cost solutions. The pixel values obtained from the camera comprise for instance grey scale data (or they may be color coded if the actual node and/or information points comprise color data), e.g. values in a range between 0 and 255. The analysis comprise setting a threshold value for where the system determines that a pixel comprise a marking or not. This threshold is settable (software or hardware vise) and may be controlled according to ambient light or dirt on the object upon where the markings are set. If a pixel completely is filled by a marked point, it may be read for example as 40 and a pixel completely without a marking may be read for example as 180, a pixel only partly filled by a marking may for example read as 90, which would be below a threshold of 100 and therefore determined as comprising a marking. It is possible to use these partly filled pixels in the analysis to enhance the accuracy of the position determination. The analysis scans over all pixels received in a frame and determines any node and information points in the frame. It may be arranged to filter out points below or over a certain number of pixels since the node and information points have a known size in pixels; e.g. points below 5 or larger than 15 may be filtered out for an application where node points have a size in the camera frame of ca 10 pixels and information points a size of ca 6 pixels. The present invention is not limited to the above exemplified values of grey scales and sizes of camera readings. This is very dependent on application and sought after accuracy of the system and may be varied in a wide range. For instance, in grey scale solutions, completely black may be represented by a 0 or a figure 255 and completely white with 255 or 0 accordingly. The pixel sizes of node and information points may be chosen to any other suitable value as understood by the person skilled in the art depending for instance on camera setting, application, and distance between the camera and the pattern.

Figure 4:
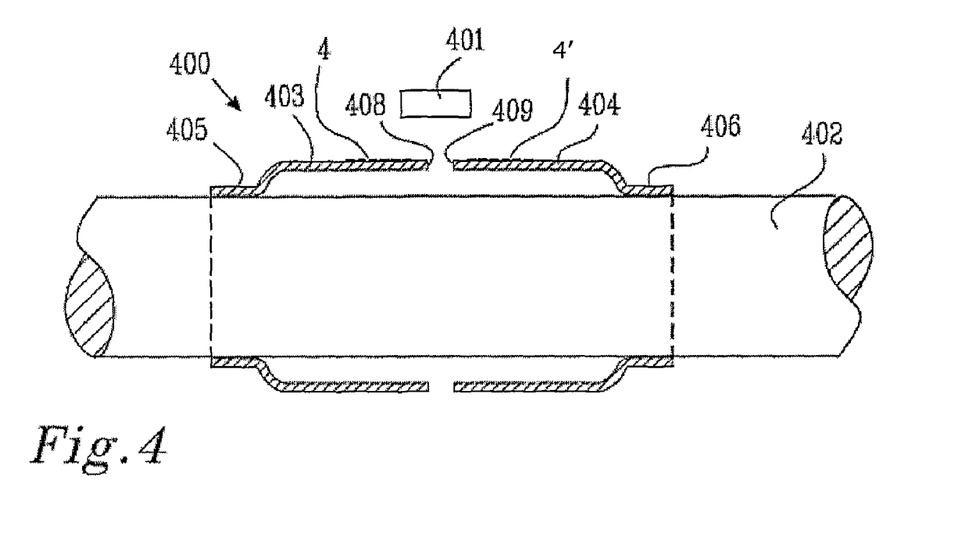
FIG. 4 illustrates an application of the present invention.

FIG. 4 illustrates schematically a torque measuring device 400 using the present invention. Using the patterns for acquiring position of an object it is possible to measure strains in the object 402. This can be done by comparing two different positions of the object 402 and measuring the relative position between them. If there is a deviation between them this can be a result of strain; this is true for instance for a torque present in a shaft 402 where the torque induces an angular shift in the shaft 402 between two different points in the longitudinal direction of the shaft 402. However, the accuracy of the measuring device is dependent on the spacing of the two measuring points; the longer the distance between the two points the larger angular deflection and thus the better accuracy. In FIG. 4, a single sensing device (e.g. an image acquiring device) is used measuring two separated patterns at the same time and in order to increase the angular deflection two sleeves 403 and 404 is used in such a manner as to amplify the angular deviation. This is accomplished by fixing one side 406 and 405 of each sleeve 403 and 404 to the shaft 402. Any angular deviation at each of the fixation points will be transferred to each sleeve 403, 404 and therefore will each free end 408, 409 of each sleeve 403, 404 deviate with the same angular shift as each fixed end 405, 406. Patterns 4 and 4' on the sleeves 403, 404 at each free end 408, 409 may be measured with the same sensing device 401. This type of solution has a benefit in that there is no need for calibration between a plurality of sensing devices, for instance timing characteristics that might be a problem if the shaft 402 is turning at speeds similar or higher than the sensing rate. For instance, in the case of image acquisition devices, the frame rate of the image acquisition device as compared to the turning speed of the shaft 402 will set the upper limit on the accuracy. However, for applications using sensing devices with high sensing rates or in applications where the object 402 is moving at a speed below the sensing rate, a plurality of sensing devices can be used and such cases sleeves 403, 404 are not needed but instead the pattern may be located directly on the shaft 402. The system may also provide information about the translational position of the shaft 402 and/or bending of the shaft 402. By providing a camera (not shown) at a different angular position (e.g. 90 degrees away from the first camera 401) but at the same shaft longitudinal position, the system may operate as an X, Y, and Z positioning device as well as providing information about torque and bending. The system may also provide information about rotational speed of the shaft.

Figure 5:
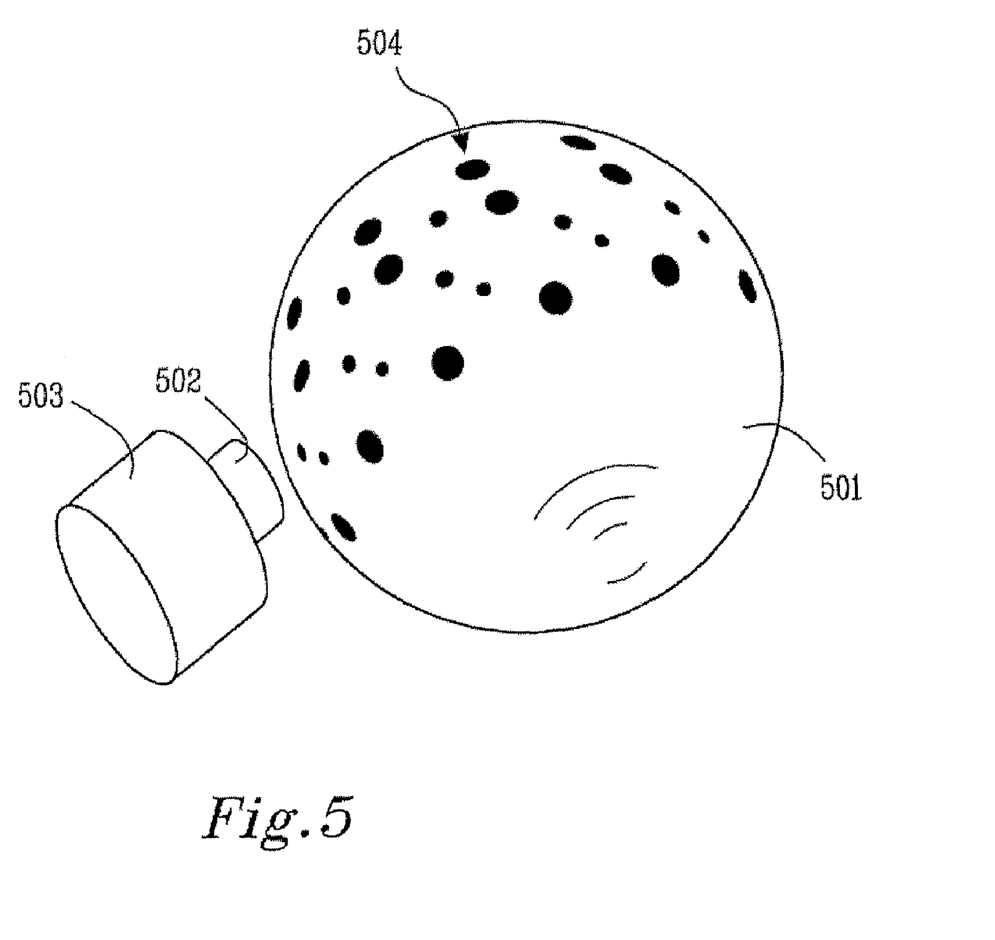
FIG. 5 illustrates another application of the present invention.

FIG. 5 illustrates an embodiment of the present invention utilized on a ball or part of a ball like structure for use in for instance a computer interface device such as a track ball, or a robot arm interface for keeping track of the position of the robot arm, in a 3D digitizer for measuring and digitizing the form of a three dimensional object. A positioning system according to this embodiment comprises a ball 501 with a pattern 504 according to the present invention arranged on the ball 501. A pattern detection system 503 comprising a computational unit (not shown) and e.g. a camera 502 detecting the position of the pattern with respect to the detection system and being able to output via an interface (not shown) images or absolute coordinates of the ball 501, depending on if the system have a computational unit or not. Since the ball and the pattern may be made in a resilient material it can be used as a load bearing element. This will be discussed more in detail later on in this document.

Figure 6:
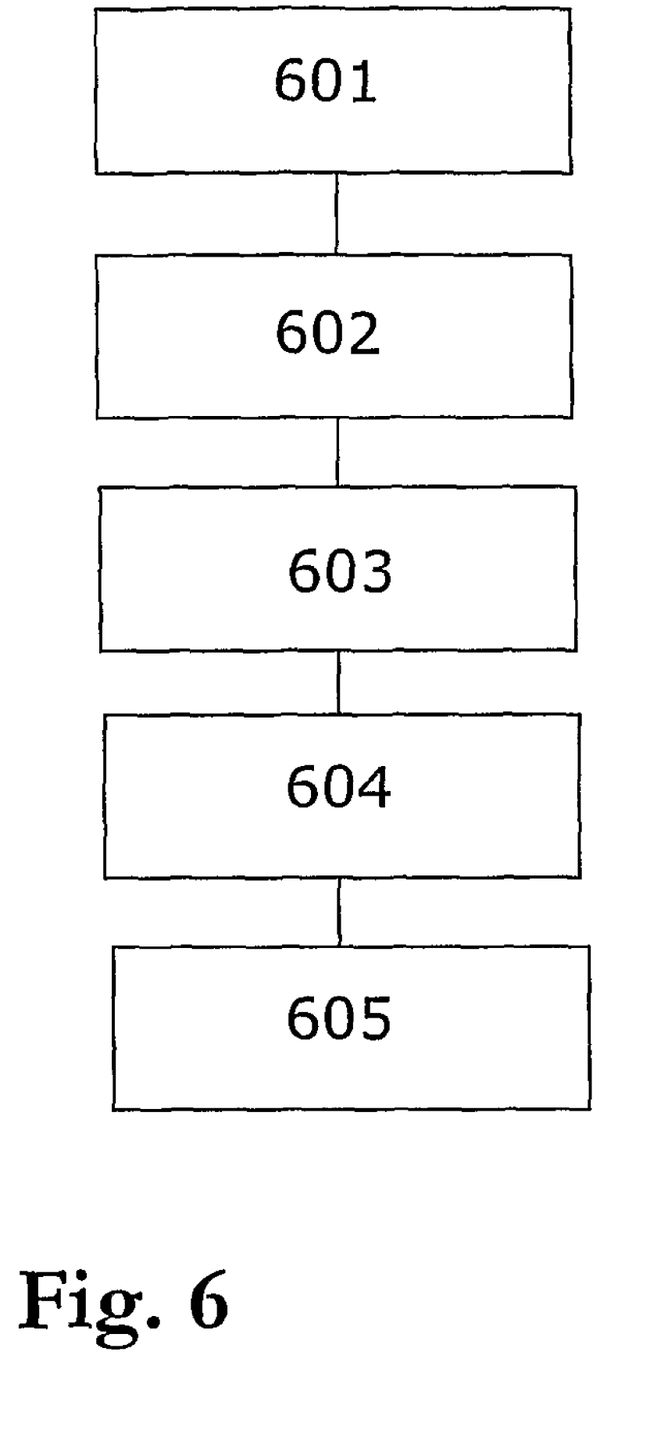
FIG. 6 illustrates schematically in a block diagram a method according to the present invention.

FIG. 6 is a schematic block diagram of a method (steps 601 to 605) for calibrating the measurement device according to the present invention. During application of the pattern on the object that one desire to know the position of one may calibrate the pattern; this may be done in a manufacturing rig where the object is fixed to in a rotatable manner (if the object is at least partly with a spherical or cylindrical geometry). The manufacturing rig may be equipped with a reference position determining device, such as an angular encoder for determination of the angular position of the object during rotation in the rig. The object may rotate while the pattern is applied thus ensuring that the pattern is applied in an angular manner (i.e. not according to a Cartesian coordinate system as explained earlier). In the same rig or at least in connection to the rig, a calibration system may be located, reading point values when rotating the object and obtaining angular measurement data from the reference position determining device. One may then obtain reference values of positions of the node points and correspondingly a calibration database may be created that may be used in devices using the present invention in order to further increase the accuracy of the measurements of the absolute position of the object in application. A similar calibration technique may be applied to the system on site for recalibration or when the system is applied to an existing application, e.g. a sleeve or film with the pattern group applied to a shaft already mounted in its proper application, it may these types of circumstances be of interest to calibrate the system in site.

The calibration method may comprise the following steps:
mounting of the object in the calibration rig (601);
obtaining pattern images of the pattern on the object (602);
obtaining absolute position data from a separate position detector (603);
associating the obtained pattern images with the absolute position of the object (604); and
providing a calibration database for the calibrated object (605). The calibration database may comprise a simple data list of calibration data, i.e. pairs of reference calibration positions and points in the obtained pattern images, or an algorithm associating points in the pattern with absolute positions.

Adjustment of thresholds and lighting conditions may be utilized by reading background areas (i.e. areas without any pixels in) for obtaining a current light condition. It is then possible to set a new threshold value between marked or unmarked pixels and also it is possible to adjust the intensity from the illumination devices 320, 330, 340, 350 by controlling the light output from these illumination devices. One method of determining the background lighting conditions may be as follows: The camera frame window may be divided into 16 sectors and with the pattern exemplified earlier one may find four sectors where no points are present (or at least only partly present), one may find these four sectors by finding four virtual points 312-315 located between each node point on a line between node points (a line not comprising information points). The sectors where in these four virtual points are located may be used as background sectors for determining the background lighting conditions. A number of such readings may be used in a cumulative and averaging algorithm to enhance the accuracy of this background lighting determination. The number of sectors and background sectors are not limited to the above mentioned but different number of such sectors may be used.

Figure 7:
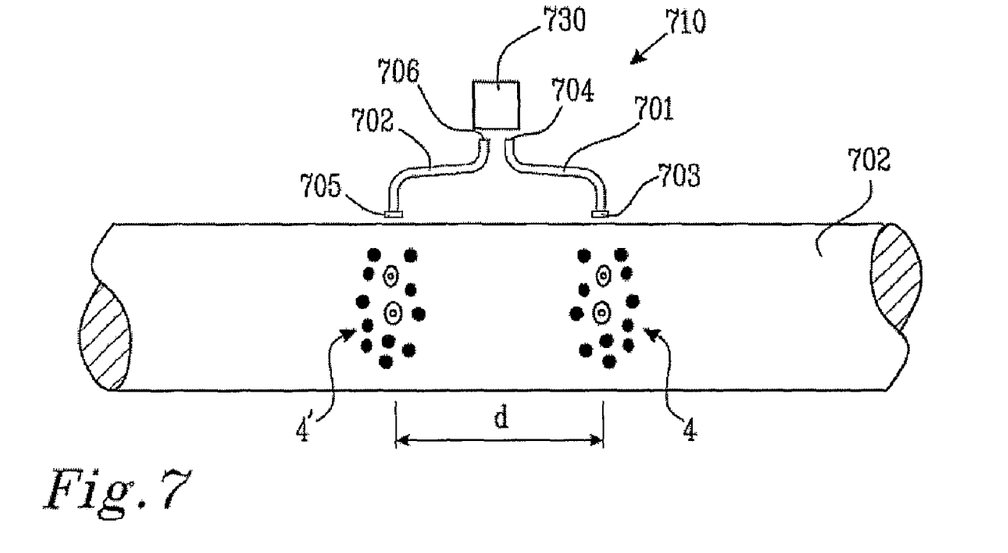
FIG. 7 illustrates another embodiment of the present invention.

Turning now to FIG. 7, illustrating an embodiment of the present invention of a torque measuring device 710, where two lines 4, 4' of pattern groupings are located on a shaft 702. Two cameras 703, 705 each take readings from one such line 4, 4' and relay either image information or position data to a central processing device 730 via cables 701, 702 and interface units 704, 706. Since the two lines of pattern groupings are separated along the shaft longitudinal direction, when a torque is applied to the shaft they will be slightly offset each other due to an angular twist of the shaft that occurs when it is subjected to a torque. This offset is proportional to the applied torque and it is thus possible to measure the torque by measuring the angular twist in the shaft. The two lines of pattern groupings should be sufficiently separated by a distance d such as to provide a measurable angular twist. The separation needed in order to acquire a sufficient measurable angular twist is a function of camera resolution, range of applied torque and desired resolution of measurement, outer diameter of shaft, and inner diameter if shaft is a tube.

In another variation of above described torque measuring device 710, the two cameras are reduced to one camera measuring on both patterns at the same time by relaying images to the camera from the two locations. This can be done by relaying the images using optical fibers, using mirrors, or a prism.

The camera may be an infrared sensitive camera detecting different temperatures in the object and the pattern on the object may be arranged with different temperature characteristics. Illumination in the infrared range may be provided in this type of solution in order to provide adequate illumination contrast and other parameters.

The present invention of determining absolute positions on objects may be utilized in a number of applications since the camera and computational systems may comprise low cost devices. Applications range from such as for instance a torque meter measuring torque in a non contact manner, for use in vehicles measuring torque in a shaft in the to drive line (for optimizing combustion processes or output power to each wheel) or in the steering wheel shaft (for use in power steering), in a bicycle (e.g. a spinning cycle used for exercise purposes), on any type of shaft where toque is of interest to measure. The invention may also be used for measuring other parameter related to a position of the object of interest, such parameters include, but are not limited to, force, rotational speed, position, and bending. The present invention may be used for instance also as a sensor for ABS (Automatic Break Systems) application, for anti spin sensors, or in CNC (computerized numerical control) machines in manufacturing for positioning the tool used in the CNC machine.

A one camera solution measuring pattern groups on an object with only rotational translation will provide an accurate and low cost solution for determining the angular position of the object, for instance as an angular encoder but with a large increase in resolution. For instance where the object is a wheel like object, e.g. a disc with a thickness sufficient enough to provide space for the pattern, the pattern may be provided on the wheel outer circumference or on a side of the wheel.

The present invention may be utilized in an articulating arm (for determining and digitizing the geometrical proportions of an object) by combining a number of different embodiments of the present invention. An articulating arm often comprises a number of joints, each with a position sensor for determining the position of each part comprising the arm. With a number of such angular joints the articulating arm can be used for determining the geometrical dimensions of the object and providing these to a computer aided design system (CAD) for obtaining the geometrical dimensions into a computational system. An articulating arm according to the present invention may comprise joints with a combination of 3D and 1D sensing devices, for instance a first 1D sensor located at the base of the arm, a second 1D sensor in each 1D joint between each arm section, and a 3D sensing device holding a probe used for determining the position of an test object under scrutiny of the articulating arm. The number and type of sensing devices forming part of the articulating arm may be varied in our configurations accomplishing the same functionality. The first 1D sensing device keeps track of the overall rotational position of the arm with respect to the surface where upon the articulating arm arrangement stands on, the second and subsequent 1D sensing devices in each joint between each arm section each keep track of a rotation position, and the 3D sensing device keeps track of the probe position relative the arm. Taking measurements from each sensing device into consideration the position of the probe relative the test object may be determined and the geometrical configuration of the test object digitized.

The present invention may also be used in a theodolite which is an instrument for measuring both horizontal and vertical angles, for instance for use in triangulation applications. The theodolite comprises a telescope mounted in such a manner as to be movably within two perpendicular axes: a horizontal axis and a vertical axis. The theodolite is often mounted on a tripod placed precisely and vertically over the point to be measured and its vertical axis aligned with local gravity. The present invention may be used for acquiring absolute positioning data for the theodolite with respect to the environment, for instance the ground position where upon the theodolite is centered above. The sensing system may be arranged as an intermediate joint between a base plate of the tripod and the telescope. However, it should be understood by the person skilled in the art that other parts and enclosures may be provided in order to build up such a device, for instance mechanical adjustment knobs for mechanically calibrate the device to a suitable position with respect to gravity and/or planar to the ground, reading displays for a user to read position data, communication interface for communicating such data to an external device (e.g. a laptop computer), power supply (e.g. external power or internal battery power). The overall composition and function of theodolites are generally known by the person skilled in the art and will not be described in this document.

One benefit of the present invention is that the pattern may be provided on load bearing elements in constructions of different applications wherein the invention may be applicable. For instance, in the case of a torque sensor, the pattern is provided on the shaft which in turn is part of the overall application wherein the shaft is located, in an articulating arm arrangement the pattern is provided on the elements taking up load forming the joints, in a bearing application the pattern may be provided on load bearing elements such as balls or cylinders forming part of ball or cylinder bearings. This benefit comes from the fact that the pattern may be provided either as part of the material of the object it self (such as dimples or indentations) or on a material resilient to mechanical wear attached to the object.

Generally this invention also has a benefit of being able to provide high speed and highly accurate measurements of absolute position data, however, the upper limit of the speed is limited to the pattern acquisition rate, for instance in case of an image acquisition system to providing images of the pattern, the frame rate of this image acquisition will set the upper limit on the rate. The present invention provide an accuracy that can exceed 10 fold the normal accuracy found in similar applications with more expensive and complex solutions in many applications.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A position detecting system, for detecting a position of an object, the system comprising:
a plurality of pattern groups arranged directly or indirectly on said object, each of the plurality of pattern groups comprising:
at least one node part comprised of at least one shape, and
at least one information part comprised of at least one shape;
at least one image acquisition device for detecting said plurality of pattern groups; and
a computational device comprising means for analysing signals for determining geometrical centres in at least two directions of each of said node parts and determining a type of part for each detected node part and information part; said node parts being arranged to provide a position relative to said image acquisition device and said information parts providing a location of said node parts relative said object.

2. The position detecting system according to claim 1, wherein said object is a three dimensional object.

3. The position detecting system according to claim 1, wherein said plurality of pattern groups is provided on a curved surface of said object.

4. The position detecting system according to claim 1, wherein two lines of said plurality of pattern groups are located essentially parallel to each other at a distance from each other in a longitudinal direction of a shaft.

5. The position detecting system according to claim 4, wherein two image acquisition devices are provided, each reading one of said two pattern group lines.

6. The position detecting system according to claim 1, further comprising at least one illumination device and the illumination is one of visible light, infrared light, x-ray light, and ultraviolet light.

7. The position detecting system according to claim 6, wherein an illumination intensity from said illumination device is controlled by said computational device.

8. The position detecting system according to claim 1, wherein said node parts and said information parts comprise at least one of a filled circle, a ring, or a ring with a center marking.

9. The position detecting system according to claim 1, wherein at least one of said node parts and said information parts are color coded.

10. The position detecting system according to claim 1, wherein said plurality of pattern groups and said image acquisition device are located in an enclosure providing protection from environmental parameters.

11. The position detecting system according to claim 1, wherein said computational device is further arranged to determine symmetrical center positions of node points using a vision based algorithm using gradient analysis.

12. The position detecting system according to claim 11, wherein the symmetrical centre is determined b said computational device for both node and information parts of the pattern.

13. The position detecting system according to claim 1, wherein the node parts comprise a plurality of different types, including filled point, unfilled point, or unfilled point with a centre dot.

14. The position detecting system according to claim 13, wherein the point has a shape chosen from one of: circular, rectangular, quadratic, or triangular.

15. The position detecting system according to claim 1, wherein the information parts comprise a plurality of different types, including filled point, unfilled point, or unfilled point with a centre dot.

16. The position detecting system according to claim 1, wherein the computational device is arranged to determine a distance between the object and the image acquisition device by measuring at least one of the size of a node part, the size of an information part, the distance between two node parts, the distance between two information parts, and the distance between a node and an information part.

17. A torque sensor, for measuring a torque in an object, the sensor comprising:
a position detection system comprising:
a plurality of pattern groups arranged directly or indirectly on said object, each of the plurality of pattern groups comprising:
at least one node part comprised of at least one shape, and
at least one information part comprised of at least one shape;
at least one image acquisition device for detecting said plurality of pattern groups; and
a computational device comprising means for analysing signals from said image acquisition device for determining geometrical centres in at least two directions of said node parts and determining a type of part for each detected node part and information part; said node parts being arranged to provide a position relative to said image acquisition device and said information parts providing a location of said node parts relative said object;
at least two sleeves, each with a plurality of said pattern groups, said sleeves mounted on said object; and
wherein said position detection system obtain position data from each sleeve and said computational device further comprise means to detect an angular difference between the position of said sleeves and to determine a torque from said angular difference.

18. A method for determining a position of an object, comprising the steps of:
detecting with a sensing device a pattern group located on said object;
determining, using symmetry analysis in at least two directions, geometrical center positions of node points forming part of said pattern group, said node points being comprised of at least one shape;
determining a type of part for each node point;
determining a type and position of information points located on said object, said information points being comprised of at least one shape; and
determining an absolute position of said object relative to said sensing device using combined information of said position and said type of points of both node and information points.

19. A computer program stored in a non-transitory tangible computer readable medium for determining a position of an object by analyzing data indicative of a pattern group located on said object, wherein said data is received from a camera, characterized in that
said computer program is arranged to determine geometrical center positions in at least two directions of node points in said pattern group for determining a position of said object relative to said camera, said node points being comprised of at least one shape, and
further arranged to determine a type and a relative position of information points in said pattern group for determining a location of said node points relative to said object, said information points being comprised of at least one shape.

20. The computer program according to claim 19, wherein symmetrical center positions of node points are determined using a vision based algorithm using gradient analysis.

21. An angular detector for determining an angular position of an object, comprising:
a position detection system comprising:
a plurality of pattern groups arranged directly or indirectly on said object, each of the plurality of pattern groups comprising:
at least one node part comprised of at least one shape, and
at least one information part comprised of at least one shape;
at least one image acquisition device for detecting said plurality of pattern groups; and
a computational device comprising means for analysing signals from said image acquisition device for determining geometrical centres in at least two directions of said node parts and determining a type of part for each detected node part and information part; said node parts being arranged to provide a position relative to said sensing device and said information parts providing a location of said node part relative said object,
wherein said computational device further comprises means for determining an angular position of said object from said signal analysis.

* * * * *